United States Patent
Kröling

(10) Patent No.: US 9,612,347 B2
(45) Date of Patent: Apr. 4, 2017

(54) COMPLIANCE CHAMBERS FOR MARINE VIBRATORS

(71) Applicant: PGS Geophysical AS, Oslo (NO)

(72) Inventor: Nils Gunnar Olof Kröling, Bjarred (SE)

(73) Assignee: PGS Geophysical AS, Oslo (NO)

( * ) Notice: Subject to any disclaimer, the term of this patent is extended or adjusted under 35 U.S.C. 154(b) by 0 days.

(21) Appl. No.: 14/577,749

(22) Filed: Dec. 19, 2014

(65) Prior Publication Data

US 2016/0047923 A1    Feb. 18, 2016

Related U.S. Application Data

(60) Provisional application No. 62/037,219, filed on Aug. 14, 2014.

(51) Int. Cl.
   *G01V 1/133*  (2006.01)
   *G01V 1/135*  (2006.01)
   (Continued)

(52) U.S. Cl.
   CPC .......... *G01V 1/133* (2013.01); *B06B 1/0611* (2013.01); *G01V 1/159* (2013.01); *G01V 1/28* (2013.01); *G01V 1/38* (2013.01); *G01V 2210/60* (2013.01)

(58) Field of Classification Search
   CPC ........ G01V 1/133; G01V 1/135; G01V 1/145; G01V 1/159
   (Continued)

(56) References Cited

U.S. PATENT DOCUMENTS 2,390,847 A * 12/1945 Olson .................. G10K 11/006
                                                           181/142
2,405,179 A *  8/1946 Black, Jr. .................. G01S 1/72
                                                           181/157
(Continued)

FOREIGN PATENT DOCUMENTS

EP          0835462 B1      1/2003
JP          61080996 A *    4/1986
(Continued)

OTHER PUBLICATIONS

European Search Report for European Application No. EP 15170537 dated Feb. 2, 2016.
(Continued)

*Primary Examiner* — Edgardo San Martin

(57) ABSTRACT

Marine vibrators and methods of use are disclosed. A marine vibrator may comprise a containment housing, where the containment housing comprises a marine vibrator internal volume, wherein the marine vibrator internal volume comprises a first gas at a first gas pressure. The marine vibrator may further comprise a sound radiating surface. The marine vibrator may additionally comprise a compliance chamber in contact with the first gas, wherein the compliance chamber comprises a chamber housing and a moveable structure, wherein at least the chamber housing and the moveable structure form a compliance chamber internal volume which holds a second gas at a second gas pressure, wherein the moveable structure is configured to move in response to a change in the first gas pressure, and wherein the compliance chamber is configured to condense the second gas in response to compression of the marine vibrator internal volume by the moveable structure.

20 Claims, 6 Drawing Sheets

(51) Int. Cl.
  *G01V 1/145* (2006.01)
  *G01V 1/02* (2006.01)
  *B06B 1/06* (2006.01)
  *G01V 1/28* (2006.01)
  *G01V 1/143* (2006.01)
  *G01V 1/38* (2006.01)

(58) Field of Classification Search
  USPC ......... 181/121, 110, 111, 113, 120; 367/172, 367/143
  See application file for complete search history.

(56) References Cited

U.S. PATENT DOCUMENTS

| | | | |
|---|---|---|---|
| 2,429,104 | A * | 10/1947 | Olson ................ G01S 1/72 367/172 |
| 2,831,177 | A * | 4/1958 | Palmer ............... G01S 1/72 333/141 |
| 3,384,868 | A | 5/1968 | Brown |
| 3,760,346 | A * | 9/1973 | Kieser ............... G01S 1/72 367/172 |
| 3,790,928 | A * | 2/1974 | Schoen, Jr. ......... G10K 11/006 367/172 |
| 3,978,940 | A | 9/1976 | Bouyoucos |
| 3,993,973 | A * | 11/1976 | Hutchins ............. G10K 9/12 367/172 |
| 4,142,171 | A * | 2/1979 | Pickens ............. G10K 9/10 367/13 |
| 4,175,311 | A | 11/1979 | Bunyan |
| 4,185,714 | A | 1/1980 | Pascouet et al. |
| 4,211,301 | A | 7/1980 | Mifsud |
| 4,231,112 | A | 10/1980 | Massa |
| 4,391,299 | A * | 7/1983 | Holmes ............. G01V 1/155 137/831 |
| 4,396,088 | A * | 8/1983 | Bayhi ............... G01V 1/135 181/106 |
| 4,458,343 | A * | 7/1984 | Tehon ............... G01S 1/72 367/149 |
| 4,483,411 | A | 11/1984 | Mifsud |
| 4,514,834 | A * | 4/1985 | Hanson .............. G01V 1/145 181/113 |
| 4,556,963 | A | 12/1985 | Hugus et al. |
| 4,557,348 | A | 12/1985 | Mifsud |
| 4,578,784 | A | 3/1986 | Mifsud |
| 4,674,074 | A * | 6/1987 | Schoen, Jr. ........ B06B 1/0655 367/167 |
| 4,739,859 | A | 4/1988 | Delano |
| 4,785,430 | A | 11/1988 | Cole |
| 4,853,905 | A | 8/1989 | Myers |
| 4,868,799 | A * | 9/1989 | Massa ................ H04R 1/44 367/172 |
| 5,016,228 | A | 5/1991 | Arnold et al. |
| 5,050,129 | A | 9/1991 | Schultz |
| 5,062,089 | A * | 10/1991 | Willard ............. G01V 1/135 181/120 |
| 5,126,979 | A | 6/1992 | Rowe, Jr. et al. |
| 5,199,005 | A | 3/1993 | Forsberg |
| 5,206,839 | A | 4/1993 | Murray |
| 5,225,731 | A | 7/1993 | Owen |
| 5,233,570 | A | 8/1993 | Donskoy |
| 5,345,428 | A * | 9/1994 | Arnold ............. B06B 1/0611 29/25.35 |
| 5,646,380 | A | 7/1997 | Vaage |
| 5,757,726 | A | 5/1998 | Tenghamn et al. |
| 5,757,728 | A | 5/1998 | Tenghamn et al. |
| 5,768,216 | A * | 6/1998 | Obata ............... G10K 9/121 310/337 |
| 5,959,939 | A | 9/1999 | Tengham et al. |
| 5,978,316 | A | 11/1999 | Ambs |
| 6,009,047 | A | 12/1999 | Barger |
| 6,041,888 | A | 3/2000 | Tengham |
| 6,076,629 | A | 6/2000 | Tengham |
| 6,076,630 | A | 6/2000 | Ambs |
| 6,085,862 | A | 7/2000 | Tenghamn |
| 6,173,803 | B1 | 1/2001 | Barger |
| 6,230,840 | B1 | 5/2001 | Ambs |
| 6,353,670 | B1 * | 3/2002 | Gasner ................ H04R 3/002 381/59 |
| 6,556,510 | B2 | 4/2003 | Ambs |
| 6,606,958 | B2 | 8/2003 | Bouyoucos |
| 6,624,539 | B1 | 9/2003 | Hansen et al. |
| 6,711,097 | B1 | 3/2004 | Engdahl |
| 6,851,511 | B2 | 2/2005 | Tenghamn |
| 6,901,028 | B2 | 5/2005 | Clayton et al. |
| 7,142,481 | B1 | 11/2006 | Metzbower et al. |
| 7,468,932 | B2 | 12/2008 | Tenghamn |
| 7,539,079 | B2 | 5/2009 | Hoogeveen et al. |
| 7,551,518 | B1 | 6/2009 | Tenghamn |
| 7,562,740 | B2 | 7/2009 | Ounadjela |
| 7,881,158 | B2 | 2/2011 | Tenghamn |
| 7,926,614 | B2 | 4/2011 | Tenghamn et al. |
| 7,929,380 | B2 | 4/2011 | Wei et al. |
| 7,957,220 | B2 | 6/2011 | Howlid et al. |
| 7,974,152 | B2 | 7/2011 | Tenghamn |
| 8,050,139 | B2 | 11/2011 | Berstad |
| 8,050,867 | B2 | 11/2011 | Johnson et al. |
| 8,061,471 | B2 | 11/2011 | Wei |
| 8,079,440 | B2 | 12/2011 | Laycock |
| 8,081,540 | B2 | 12/2011 | Ross |
| 8,094,514 | B2 | 1/2012 | Tenghamn |
| 8,098,542 | B2 | 1/2012 | Hillesund et al. |
| 8,102,731 | B2 | 1/2012 | Cambois |
| 8,154,176 | B2 | 4/2012 | Karakaya et al. |
| 8,167,082 | B2 | 5/2012 | Eick et al. |
| 8,174,927 | B2 | 5/2012 | Hopperstad et al. |
| 8,189,426 | B2 | 5/2012 | West et al. |
| 8,205,711 | B2 | 6/2012 | Hopperstad et al. |
| 8,261,875 | B2 | 9/2012 | Eick et al. |
| 8,331,198 | B2 | 12/2012 | Morozov et al. |
| 8,335,127 | B2 | 12/2012 | Tenghamn |
| 8,342,288 | B2 | 1/2013 | Eick et al. |
| 8,400,872 | B2 | 3/2013 | Gulgne et al. |
| 8,427,901 | B2 | 4/2013 | Lunde et al. |
| 8,441,892 | B2 | 5/2013 | Morozov et al. |
| 8,446,798 | B2 | 5/2013 | Tenghamn |
| 8,488,415 | B2 * | 7/2013 | Graber ............... G10K 9/13 367/172 |
| 8,582,395 | B2 | 11/2013 | Ferber |
| 8,630,149 | B2 | 1/2014 | Thompson et al. |
| 8,634,276 | B2 | 1/2014 | Morozov et al. |
| 8,662,243 | B2 | 3/2014 | Eick et al. |
| 8,670,292 | B2 | 3/2014 | Engdahl |
| 8,804,462 | B2 | 8/2014 | Babour et al. |
| 8,971,152 | B2 | 3/2015 | Chelminski |
| 2006/0193203 | A1 | 8/2006 | Tenghamn et al. |
| 2008/0253226 | A1 | 10/2008 | Tenghamn et al. |
| 2009/0147626 | A1 | 6/2009 | Vahida et al. |
| 2009/0279387 | A1 | 11/2009 | Tenghamn et al. |
| 2010/0118647 | A1 | 5/2010 | Tenghamn |
| 2010/0322028 | A1 | 12/2010 | Tenghamn |
| 2011/0038225 | A1 | 2/2011 | Tenghamn |
| 2011/0069741 | A1 | 3/2011 | Erickson |
| 2011/0075520 | A1 | 3/2011 | Gulgn et al. |
| 2011/0085422 | A1 | 4/2011 | Thompson et al. |
| 2011/0090759 | A1 | 4/2011 | Laycock |
| 2011/0162906 | A1 | 7/2011 | Harper et al. |
| 2011/0297476 | A1 | 12/2011 | Harper et al. |
| 2011/0317515 | A1 | 12/2011 | Tenghamn |
| 2012/0075955 | A1 | 3/2012 | Dean |
| 2012/0081997 | A1 | 4/2012 | Babour et al. |
| 2012/0113747 | A1 | 5/2012 | Ferber |
| 2012/0147699 | A1 | 6/2012 | Dellinger et al. |
| 2012/0147709 | A1 | 6/2012 | Zowarka, Jr. et al. |
| 2012/0155217 | A1 | 6/2012 | Dellinger et al. |
| 2012/0188845 | A1 | 7/2012 | Jeffryes |
| 2012/0232780 | A1 | 9/2012 | Delson et al. |
| 2012/0243378 | A1 * | 9/2012 | Morozov ............. G01V 1/145 367/143 |
| 2012/0314536 | A1 | 12/2012 | Bagaini |
| 2013/0037342 | A1 | 2/2013 | Engdahl |

(56) References Cited

U.S. PATENT DOCUMENTS

| | | |
|---|---|---|
| 2013/0100777 A1 | 4/2013 | Ruet |
| 2014/0238773 A1 | 8/2014 | Sallas |
| 2014/0334254 A1 | 11/2014 | Zrostlik et al. |
| 2014/0334259 A1 | 11/2014 | Tenghamn |
| 2014/0340985 A1 | 11/2014 | Tenghamn et al. |
| 2015/0085605 A1 | 3/2015 | Tenghamn |
| 2015/0085606 A1 | 3/2015 | Tenghamn et al. |
| 2015/0085607 A1 | 3/2015 | Tenghamn |
| 2015/0085608 A1 | 3/2015 | Tenghamn et al. |
| 2015/0234072 A1 | 8/2015 | McConnell |
| 2016/0109599 A1* | 4/2016 | Kroling ............ G01V 1/135 92/76 |

FOREIGN PATENT DOCUMENTS

| | | |
|---|---|---|
| RU | 93052952 A | 2/1995 |
| RU | 2159945 C1 | 11/1999 |
| WO | 87/05772 | 9/1987 |
| WO | 8705772 | 9/1987 |
| WO | 9530912 A1 | 11/1995 |
| WO | 9701770 A1 | 1/1997 |
| WO | 0071266 A1 | 11/2000 |
| WO | 2009/153595 | 12/2009 |
| WO | 2009153595 | 12/2009 |

OTHER PUBLICATIONS

Rune Tenghamn, "PGS Electrical Marine Vibrator," Tech Link, Nov. 2005, pp. 1-3, vol. 5, No. 11, Publication of PGS Geophysical.

Rune Tenghamn and Andrew Long, PGS shows off electrical marine vibrator to capture 'alternative' seismic source market, First Break, Jan. 2006, pp. 11-14, vol. 24.

Rune Tenghman, "Complementing Seismic Source Technology with Marine Vibrators," Presented at PGS Technology day in Oslo, Norway, Oct. 16, 2012.

Feng et al., "A Class IV Flextensional Device Based on Electrostrictive Poly(vinylidene fluoride-trifluoroethylene Copolymer," Jun. 2003, pp. 1-6.

Ralph S. Woollett, "Underwater Helmholtz-Resonator Transducers: General Design Principles," NUSC Technical Report 5633, Jul. 5, 1977, pp. 1-48.

Rolex Spring Catalog, MW Industries, Inc., 2009.

Fons Ten Kroode et al., "Broadband seismic data—The importance of low frequencies," Geophysics, Mar.-Apr. 2013, pp. WA3-WA14, vol. 78, No. 2.

Ralph S. Woollett, "Current Approaches to the Miniaturization and Pressure Release Problems of VLF Transducers," Naval Underwater Systems Center, Nov. 5, 1973.

Erardo Elizondo, "Production of Optimised Metal Foams for Stirling Engine Regenerators," Mar. 2011.

European Search Report for Application No. 15180537.1 dated Feb. 22, 2016.

* cited by examiner

US 9,612,347 B2

COMPLIANCE CHAMBERS FOR MARINE VIBRATORS

CROSS-REFERENCE TO RELATED APPLICATIONS

The present application claims priority to U.S. Provisional Application No. 62/037,219, filed on Aug. 14, 2014, the entire disclosure of which is incorporated herein by reference.

BACKGROUND

Embodiments relate generally to vibrators for marine geophysical surveys, and, more particularly, embodiments relate to the use of compliance chambers in marine vibrators to compensate for air-spring effects.

Sound sources are generally devices that generate acoustic energy. One use of sound sources is in marine seismic surveying. Sound sources may be employed to generate acoustic energy that travels downwardly through water and into subsurface rock. After interacting with the subsurface rock, for example, at the boundaries between different subsurface layers, some of the acoustic energy may be reflected back toward the water surface and detected by specialized sensors. The detected energy may be used to infer certain properties of the subsurface rock, such as the structure, mineral composition and fluid content. These inferences may provide information useful in the recovery of hydrocarbons.

Most of the sound sources employed today in marine seismic surveying are of the impulsive type, in which efforts are made to generate as much energy as possible during as short a time span as possible. The most commonly used of these impulsive-type sources are air guns that typically utilize compressed air to generate a sound wave. Other examples of impulsive-type sources include explosives and weight-drop impulse sources. Another type of sound source that can be used in marine seismic surveying includes marine vibrators, such as hydraulically powered sources, electro-mechanical vibrators, electrical marine seismic vibrators, and sources employing piezoelectric or magnetostrictive material. Marine vibrators typically generate vibrations through a range of frequencies in a pattern known as a "sweep" or "chirp."

A marine vibrator may radiate sound by moving a number of sound radiating surfaces that are connected to a mechanical actuator. During this motion these surfaces displace a certain volume. This displaced volume may be the same outside and inside the marine vibrator. Inside the marine vibrator this volume displacement may cause a pressure variation that in absolute values increases substantially while the marine vibrator is lowered to increasing depths. As the internal gas (e.g., air) in the marine vibrator increases in pressure, the bulk modulus (or "stiffness") of the internal gas also rises. Increasing the bulk modulus of the internal gas also increases the air-spring effect within the marine vibrator. As used herein, the term "air spring" is defined as an enclosed volume of air that may absorb shock or fluctuations of load due to the ability of the enclosed volume of air to resist compression. Increasing the stiffness of the air in the enclosed volume increases the air-spring effect and thus the ability of the enclosed volume of air to resist compression. This increase in the air-spring effect of the internal gas tends to be a function of the operating depth of the source. Further, the stiffness of the acoustic components of the marine vibrator and the internal gas are the primary determining factors in the marine vibrator's resonance frequency. Accordingly, the resonance frequency generated by the marine vibrator may undesirably increase when the marine vibrator is towed at depth, especially in marine vibrators where the interior volume of the marine vibrator may be pressure balanced with the external hydrostatic pressure. Hence, in applications it may be desirable that a resonance frequency can be retained independently of the operation depth and/or that the output resonance frequency can be controlled so as to be below and/or above its nominal resonance frequency.

BRIEF DESCRIPTION OF THE DRAWINGS

These drawings illustrate certain aspects of some of the embodiments of the present invention and should not be used to limit or define the invention.

DETAILED DESCRIPTION

Figure 1:
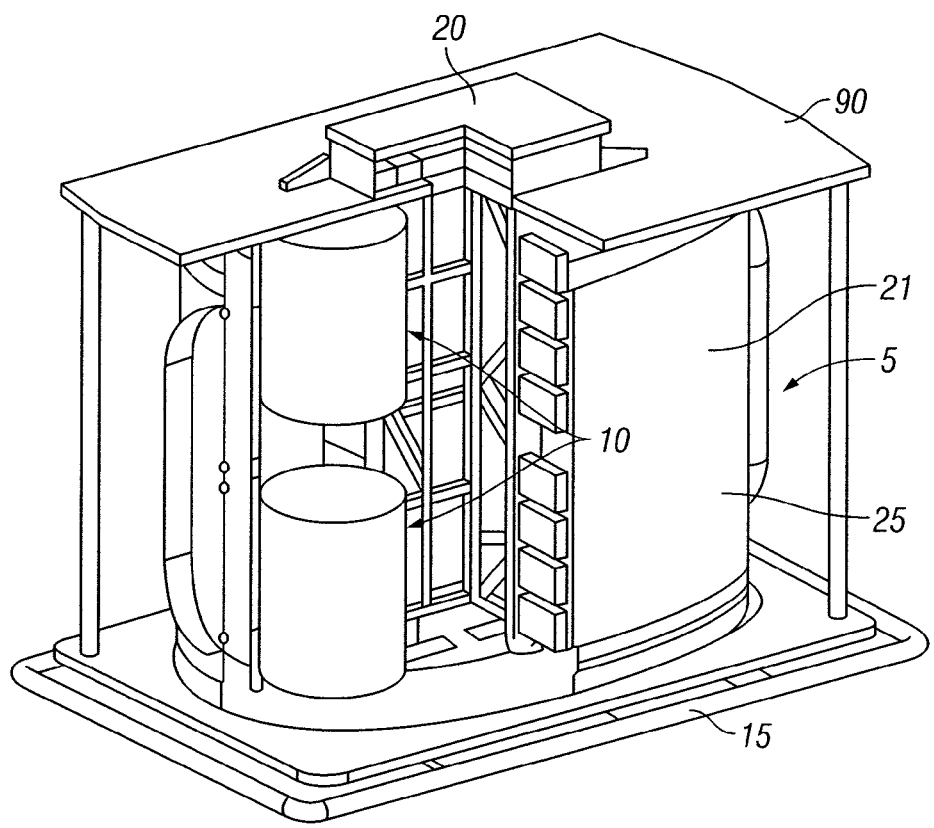
FIG. 1 illustrates an example embodiment of a flextensional shell-type marine vibrator comprising a compliance chamber.

It is to be understood that the present disclosure is not limited to particular devices or methods, which may, of course, vary. It is also to be understood that the terminology used herein is for the purpose of describing particular embodiments only, and is not intended to be limiting. All numbers and ranges disclosed herein may vary by some amount. Whenever a numerical range with a lower limit and an upper limit is disclosed, any number and any included range falling within the range are specifically disclosed. Although individual embodiments are discussed, the invention covers all combinations of all those embodiments. As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected. If there is any conflict in the usages of a word or term in this specification and one or more patent or other documents that may be incorporated herein by reference, the definitions that are consistent with this specification should be adopted for the purposes of understanding the invention.

Embodiments relate generally to marine vibrators for marine geophysical surveys that may act on the surrounding water to produce acoustic energy. More particularly, embodiments relate to use of compliance chambers with marine vibrators to compensate for volume changes of the internal gas to the marine vibrators during operation. As discussed in more detail below, the compliance chamber may shift the resonance frequency of the marine vibrator lower and may also increase the sound output at lower frequencies. Advantageously, the marine vibrators may display a low resonance frequency in the seismic frequency range of interest. In particular embodiments, the marine vibrators may display a first resonance frequency within the seismic frequency range of about 1 Hz to about 10 Hz when submerged in water at a depth of from about 0 meters to about 300 meters.

Marine vibrators may be used in marine geophysical surveying to generate acoustic energy that travels downwardly through water and downwardly into the subsurface rock. Embodiments of the marine vibrators may include flextensional shell marine vibrators, piston-plate marine vibrators, hydraulically powered vibrators, electro-mechanical vibrators, electrical marine seismic vibrators, and vibrators employing electrostrictive (e.g., piezoelectric) or magnetostrictive material. It is to be noted that unless specifically excluded, any disclosure regarding compliance chambers may be embodied by any of the embodiments of the type of marine vibrators discussed herein and that no embodiment of a compliance chamber is to be restricted to a specific type of marine vibrator.

Flextensional shell-type marine vibrators may include actuators and transducers and may act as mechanical transformers, which transform and amplify the displacement generated in the active element to meet the demands of different applications. Flextensional shell marine vibrators are generally marine vibrators having an outer shell that vibrates and flexes to generate acoustic energy. A flextensional shell-type marine vibrator 5 is illustrated in FIG. 1. FIG. 1 illustrates an example embodiment of a flextensional shell-type marine vibrator 5 that employs one or more compliance chambers 10, for example, to compensate for pressure changes of the internal gas pressure. The flextensional shell-type marine vibrator 5 of FIG. 1 is shown in partial cross-section. As illustrated, the flextensional shell-type marine vibrator 5 is mounted within a frame 15. A bracket 20 may be mounted to the top of the frame 15. The bracket 20 may be used for deploying the flextensional shell-type marine vibrator 5 in a body of water. The flextensional shell-type marine vibrator 5 comprises at least one sound radiating surface 21 as illustrated by outer shell 25. As illustrated, the compliance chambers 10 may be disposed within the outer shell 25. Alternatively, compliance chambers 10 may be disposed on the exterior of flextensional shell-type marine vibrator 5. Compliance chamber 10 may be disposed on the exterior of any part of containment housing 90 of shell-type marine vibrator 5. Containment housing 90 defines at least a portion of the marine vibrator internal volume. While FIG. 1 illustrates two compliance chambers 10 disposed within the outer shell 25, it should be understood that the invention is applicable to the use of any number of compliance chambers 10 in a flextensional shell-type marine vibrator 5. By way of example, embodiments may include the use of one, two, three, four, or more compliance chambers 10 for the flextensional shell-type marine vibrator 5. In the illustrated embodiment, the outer shell 25 may be elliptical in shape or other suitable shape, including convex, concave, flat, or combinations thereof. While not illustrated, the outer shell 25 may be formed, for example, by two shell side portions that may be mirror images of one another.

Figure 2:
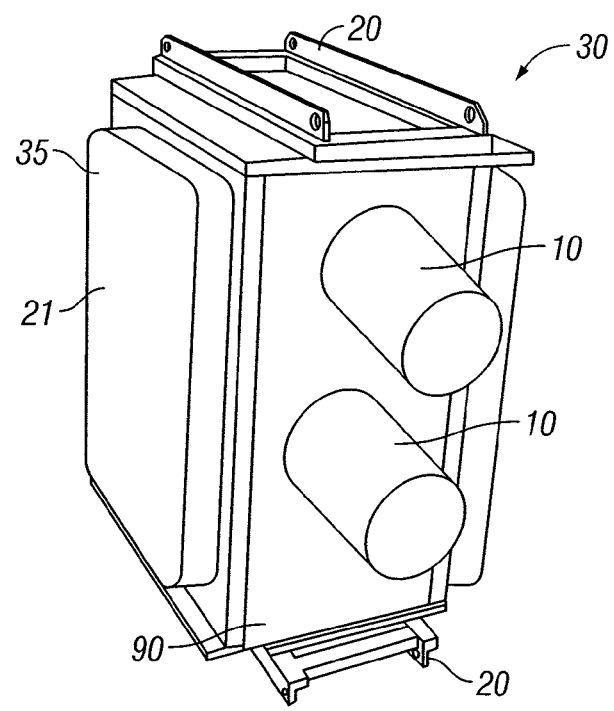
FIG. 2 illustrates an example embodiment of a piston-type marine vibrator comprising a compliance chamber.

Piston-type marine vibrators, which may include an actuator and a spring, act as mechanical transformers, which transform the displacement and force generated in the active element to meet the demands of different applications. Piston-type marine vibrators are generally marine vibrators having a piston plate that vibrates to generate acoustic energy. FIG. 2 is an example embodiment of a piston-type marine vibrator, illustrated as piston-type marine vibrator 30. As illustrated, piston-type marine vibrator 30 may comprise outer piston plates 35 and compliance chambers 10. Piston-type marine vibrator 30 comprises at least one sound radiating surface 21 as illustrated by outer piston plates 35. In the illustrated embodiment, compliance chambers 10 are disposed on the exterior of the piston-type marine vibrator 30. In alternative embodiments, compliance chambers 10 may be disposed on the interior of piston-type marine vibrator 30. While FIG. 2 illustrates two compliance chambers 10 disposed on the exterior of piston-type marine vibrator 30, it should be understood that the invention is applicable to the use of any number of compliance chambers 10 in a piston-type marine vibrator 30. By way of example, embodiments may include the use of one, two, three, four, or more compliance chambers 10 for the piston-type marine vibrator 30. Piston-type marine vibrator 30 may include brackets 20, which may be separately mounted on opposing sides of piston-type marine vibrator 30, or may be mounted on adjacent sides. Alternatively, only one bracket 20 may be used. Brackets 20 may be used for hoisting piston-type marine vibrator 30, for example when a deploying piston-type marine vibrator 30 in the water. By way of example, brackets 20 may facilitate attachment of piston-plate marine vibrator 30 to tow lines, a survey vessel (e.g., survey vessel 125 on FIG. 9), or other suitable device or mechanism used in conjunction with towing piston-type marine vibrator 30 through a body of water.

Any of the marine vibrators discussed herein may have an internal gas pressure. By way of example, the marine vibrator may define an internal volume in which a gas may be disposed. The internal volume of a marine vibrator will be referred to herein as the "marine vibrator internal volume." In some embodiments, the marine vibrators may have a pressure compensation system. The pressure compensation system may be used, for example, to equalize the internal gas pressure of the marine vibrator with the external pressure. The internal gas pressure of the marine vibrator will be referred to herein as the "marine vibrator internal gas pressure." Pressure compensation may be used, for example, where a marine vibrator needs to be towed at depth to achieve a given level of output. As the depth of a marine vibrator increases, the marine vibrator internal gas pressure may be increased to equalize pressure with the increasing external pressure. A gas (e.g., air) may be introduced into marine vibrator, for example, to increase the marine vibrator internal gas pressure. Alternatively or in addition to the above, the internal temperature may be raised at operational depth or as the marine vibrator approaches operational depth as necessary to raise the internal gas pressure of the marine equal to or slightly above the external pressure.

Without being limited by theory, increasing the marine vibrator internal gas pressure may create an air-spring effect that may undesirably impact the resonance frequency of the marine vibrators. In particular, the resonance frequency may increase as the marine vibrator internal gas pressure increases. Those of ordinary skill in the art, with the benefit of this disclosure, should appreciate that an increase in the marine vibrator internal gas pressure may also result in an increase of the bulk modulus or air-spring effect of the gas (e.g., air) in the marine vibrator. Among other things, the resonance frequency of the marine vibrator may be based on the combination of the air spring of the gas in marine vibrator and any such spring constant of such spring (e.g., mechanical springs, nonmechanical springs, linear springs, nonlinear springs, etc). Thus, increasing the bulk modulus or air-spring effect of the internal gas of a marine vibrator may also result in an increase in the resonance frequency. As such, the resonance frequency of a marine vibrator towed at depth may undesirably increase when the marine vibrator internal gas pressure is compensated by equalization with the external pressure (e.g., by using a pressure compensation system).

To compensate for changes in the marine vibrator internal gas pressure, compliance chamber 10 may be employed. In accordance with present embodiments, compliance chamber 10 may be a bi-phasic system with a mixture of a liquid and gas contained within. The compliance chamber 10 may contain a mixture of a liquid (e.g., water) and a gas (e.g., water vapor) with an internal gas pressure equal to or lower than the marine vibrator internal gas pressure. In alternative embodiments, the internal gas pressure of the compliance chamber 10 may be greater than the marine vibrator internal gas pressure. In addition to water, other liquids such as ammonia and the like may also be used. Additional examples of suitable gases used in compliance chamber 10 may include inert gases having a low bulk modulus (e.g., lower bulk modulus than air). Examples of gases may include propane and tetrafluoroethane. The internal volume of compliance chamber 10 will be referred to herein as the "chamber internal volume." The internal gas pressure of compliance chamber 10 will be referred to herein as the "chamber internal gas pressure." In example embodiments, the chamber internal gas pressure may be less than 1 atmosphere. In some embodiments, the chamber internal gas pressure is sufficiently low such that a vacuum or essentially a vacuum may be established in compliance chamber 10. In some embodiments, compliance chamber 10 may be pre-compensated. In pre-compensated embodiments, the compliance chamber may be placed into a compressed state with a pre-determined load so that it may only operate when it reaches a certain depth at which the hydrostatic pressure exceeds the load. At that depth and below, the compliance chamber 10 will function as described herein. Without limitation, pre-compensation may be useful in embodiments where smaller compliance chambers 10 are desirable. In pre-compensated embodiments, the chamber internal gas pressure is still equal to or lower than the marine vibrator internal gas pressure, and the compliance chamber 10 is not compensated to the extent that its chamber internal gas pressure would exceed that of the marine vibrator internal gas pressure.

In some embodiments, compliance chamber 10 may comprise a sealed volume with a chamber internal gas pressure of less than 1 atmosphere when at the water surface (less than about 1 meter depth). Alternatively, the chamber internal gas pressure may be equal to or greater than atmospheric pressure when at the water surface. In present embodiments, when the marine vibrators are at operational depth, the chamber internal gas pressure may be less than the marine vibrator internal gas pressure. In some embodiments, the marine vibrators may be operated, for example, at a depth of from about 1 meter to about 300 meters and, more particularly, from about 1 meter to about 100 meters. Embodiments of compliance chambers 10 may comprise a spring-piston assembly in a chamber with the chamber internal gas pressure less than the marine vibrator internal gas pressure.

Figure 3:
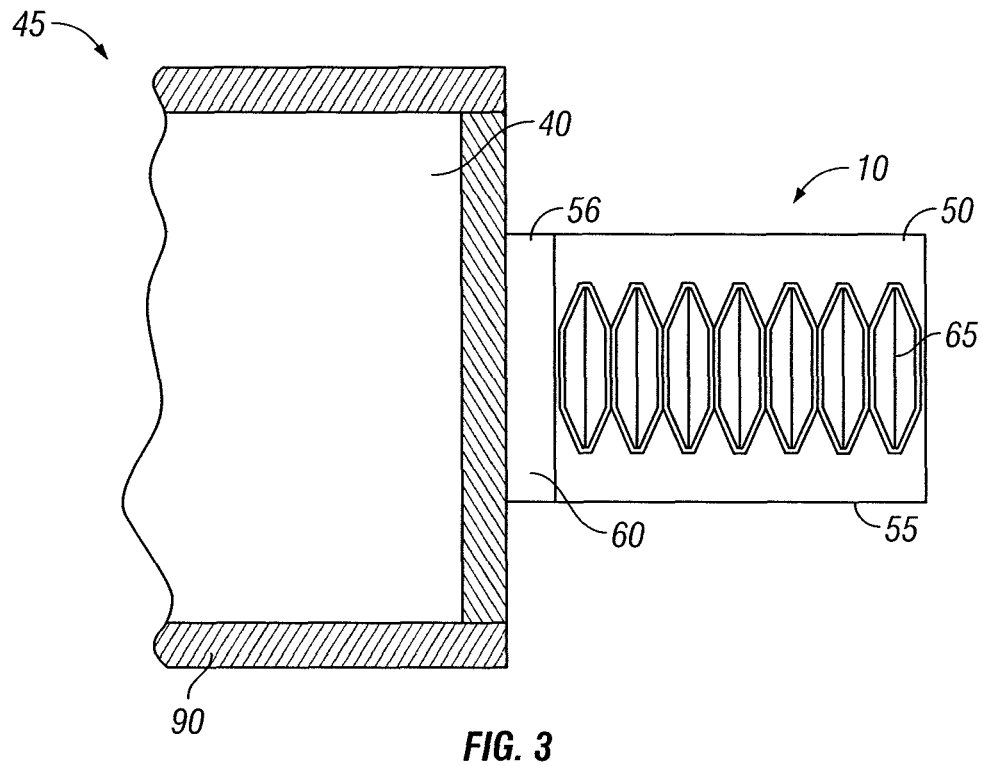
FIG. 3 illustrates an example embodiment of a compliance chamber.

In some embodiments, a compliance chamber 10 may comprise at least one piston attached by an elastic component (e.g., a bellow (not shown) connected to a wall of the compliance chamber 10). In various embodiments, a pressurized gas can act on the outside of the piston and a compressed spring element can act from inside the compliance chamber against the other side of the same piston such that the spring element balances the force created by the pressurized gas. This type of compliance chamber is generally illustrated by FIG. 3. As illustrated, marine vibrator internal volume 40 is disposed within marine vibrator 45. Marine vibrator 45 may be any type of marine vibrator including flextensional shell-type marine vibrator 5 or piston-type marine vibrator 30. In the illustrated embodiment, marine vibrator internal volume 40 may contain a gas, such as air, to provide a marine vibrator internal gas pressure. Compliance chamber 10 may be in contact with marine vibrator internal volume 40. Compliance chamber 10 may have a chamber internal volume 50, which may provide a chamber internal gas pressure. In some embodiments chamber internal volume 50 may contain a gas. In some embodiments, chamber internal volume 50 may contain a mixture of a liquid and a gas, such as water and water vapor. As previously described, the chamber internal gas pressure may be less than the marine vibrator internal gas pressure. The chamber internal gas pressure may be less than 1 atmosphere. In accordance with present embodiments, chamber internal volume 50 may be sealed so as to not result in a chamber internal gas being in contact with any marine vibrator internal gas which may be present in marine vibrator internal volume 40.

As illustrated, compliance chamber 10 may comprise a chamber housing 55, a chamber piston 60, and a spring element 65. In some embodiments, chamber internal volume 50 may be defined by chamber housing 55 and a moveable structure 56 which comprises chamber piston 60. Chamber housing 55 may be made of any such suitable materials, including, without limitation, metals and plastics. Chamber piston 60 may be slidable in chamber housing 55 such that, when driven into or out of chamber housing 55, the chamber internal volume 50 may be changed. Chamber piston 60 may be designed with sufficient displacement in chamber housing 55 to compensate for a change in marine vibrator internal gas pressure, for example, due to a change in depth and/or any change in marine vibrator internal volume 40 due to the operation of a marine vibrator 45. Gas within marine vibrator 45 may contact the marine vibrator facing surface of moveable structure 56 through a void or hole in containment housing 90 in which compliance chamber 10 is coupled to marine vibrator 45. For simplicity of illustration, the hole in containment housing 90 is not shown as it would be blocked from view in this perspective by containment housing 90. The chamber piston 60 may be sealed in chamber housing 55, for example, with an O-ring, rubber seal, piston rings, bellows, etc. While chamber piston 60 is shown as a disk or other cylindrical element, it should be understood that other configurations for chamber piston 60 may be used to effect a desired chamber internal volume change in chamber housing 55. For example, chamber piston 60 may have a different configuration, including square, rectangular, or oblong, among others. In some embodiments, chamber piston 60 may be loaded in chamber housing 55 with spring element 65.

As illustrated, spring element 65 may be disposed within chamber internal volume 50 to exert a biasing action on chamber piston 60. Spring element 65 may be any spring suitable for exerting a biasing action on chamber piston 60, including both linear and non-linear springs. By way of example, spring element 65 may be a compression spring, a torsion spring, a compound that undergoes a reversible gas to liquid phase change, a hollow flextensional shell, or any other suitable spring for exerting the desired biasing action. FIG. 3 generally illustrates a nonlinear mechanical spring element 65. Specific examples of nonlinear mechanical springs that may be used for chamber spring element 65 include coil springs, leaf springs, and Belleville spring washers, among others. Non-linear springs may be advantageous in certain embodiments by providing a softening response as the pressure increases. Examples of suitable Belleville spring washers may include the AM Series Belleville springs available from Rolex Springs, Baltimore, Md., such as the Rolex Spring AM-25012770. Spring element 65 may include one or more spring stacks of spring washers. Those of ordinary skill in the art will appreciate that multiple Belleville spring washers may be stacked to modify the spring constant. Stacking in the same direction will add the spring constant in parallel to create a stiffer spring. Stacking in an alternating direction is similar to adding springs in series and may create a lower spring constant with more deflection. Stacking multiple Belleville spring washers in alternating directions and different configurations may allow design of a spring element 65 with a specific spring constant.

Operation of compliance chamber 10, as shown in FIG. 3, will now be described in accordance with the example embodiment. Compliance chamber 10 may operate due to a change in the pressure differential across chamber piston 60 between the marine vibrator internal volume 40 and the chamber internal volume 50. By way of example, the change in the pressure differential may be caused by an increase in the marine vibrator internal gas pressure due to increased depth and/or the acoustic operation of marine vibrator 45. In the illustrated embodiment, the resulting force due to the pressure differential may be counteracted by a force applied to chamber piston 60 by spring element 65. Increasing the marine vibrator internal gas pressure within marine vibrator internal volume 40 typically results in an increased force requirement by compliance chamber 10. In embodiments where a compression spring is used for spring element 65, increased force may be achieved through a displacement such that a volume change may occur within chamber internal volume 50 due to changes in the marine vibrator internal gas pressure within marine vibrator 45. The change in chamber internal volume 50 may compensate for the change in marine vibrator internal volume 40 and the increase in marine vibrator internal gas pressure. As a result, stiffness effects (i.e., the air-spring effect) on marine vibrator 45 resonance frequency may be reduced.

Further a gas, or a mixture of a gas and a liquid, could also exert a biasing action against chamber piston 60 and would thus act as spring element 65. Optionally, a gas or a mixture of a gas and a liquid acting as spring element 65 may also act in combination with other types of spring elements 65 such as those described above. The gas may exert a biasing action as the pressure of the gas increases. The pressure of the gas may increase due to compression of the chamber piston 60 into the chamber internal volume 50, thus reducing chamber internal volume 50 and increasing the internal chamber pressure. In addition to this mechanism of pressure increase, for embodiments encompassing a mixture of a gas and a liquid, evaporation of the liquid in the chamber internal volume 50 may increase the pressure of the gas in the chamber internal volume 50 and thus increase the internal chamber pressure. Thus, a gas or a mixture of a gas and liquid acting as spring element 65 may act such that the chamber piston 60 follows the changes of displaced volume in the marine vibrator internal volume 40 and the internal gas volume and gas pressure of the marine vibrator 45 is held about constant. In this context, "about" is defined as a deviation of less than or equal to 10% of the measured internal gas pressure of the marine vibrator 45. As a result, stiffness effects (i.e., the air-spring effect) on marine vibrator 45 resonance frequency may be reduced.

Figure 4:
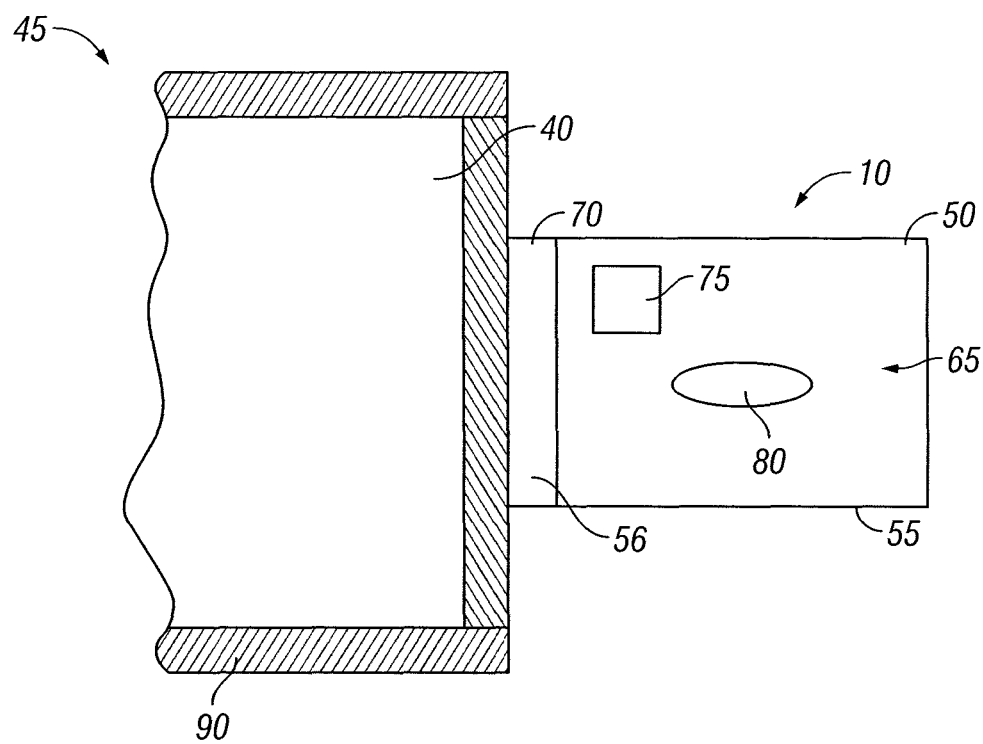
FIG. 4 illustrates another example embodiment of a compliance chamber.

FIG. 4 describes another embodiment of a compliance chamber 10. The compliance chamber 10 of FIG. 4 may be disposed on the interior or the exterior of any type of marine vibrator 45. The compliance chamber 10 of FIG. 4 comprises a chamber housing 55 and a and a moveable structure 56 which comprises a flexible membrane 70. It should be noted that although "membrane" may be known as a selective barrier according to some definitions, as used herein, a "membrane" does not allow for any such passage of a gas or liquid from the internal chamber volume 50 to the marine vibrator internal volume 40 and vice versa. The flexible membrane 70 may be any such material with sufficient flexibility so as to allow the flexible membrane 70 to follow the changes of displaced volume in the marine vibrator internal volume 40 such that the internal gas volume and gas pressure of the marine vibrator 45 is held nearly constant. In this context, "about" is defined as a deviation of less than or equal to 10% of the measured internal gas pressure of the marine vibrator 45. Examples of materials include rubber (both natural and synthetic) and other polymers and/or elastomers, specific examples may include silicone rubber, ethylenepropylenediene monomer (M-class) rubber, nitrile rubber, polyurethane rubber, and the like. The flexible membrane 70 may expand or be displaced into marine vibrator internal volume 40 when the marine vibrator internal gas pressure is less than the chamber internal gas pressure. Conversely, the flexible membrane may expand or be displaced into chamber internal volume 50 when the marine vibrator internal gas pressure is greater than the chamber internal gas pressure.

With continued reference to FIG. 4, the compliance chamber 10 embodiment in FIG. 4 may comprise a gas, or a mixture of a gas and a liquid, which function as the spring element 65. Without limitation, examples of a gas may include, propane, tetrafluoroethane, and the like. In embodiments, the temperature inside the compliance chamber 10 may be increased with a heating unit 75. Heating unit 75 may be any such heating unit suitable for embodiments. Heating unit 75 may be used to evaporate a gas within the chamber internal volume 50 to reach a pressure equilibrium between the marine vibrator 45 and the compliance chamber 10 should the two not be in equilibrium once the marine vibrator 45 reaches operational depth. In embodiments, it may be important to keep the temperature constant in the compliance chamber 10, thus a control system (not shown) may be used to regulate heating unit 75. Further, a heat exchanger 80, for example, a condenser, may be used to condense the gas into a thin film on a surface of the condenser. Thus, by using a heating unit 75 to keep a constant temperature above the evaporation point of the gas concurrently with a condenser to condense the gas and reduce the gas pressure within the chamber internal volume 50, the gas pressure within the compliance chamber 10 is able to adjust to follow the fluctuations of the gas pressure within the marine vibrator internal volume 40. For example, as the internal gas pressure of the marine vibrator 45 increases as the marine vibrator 45 reaches operational depth and begins to operate, the flexible membrane 70 may expand into the chamber internal volume 50. The condenser within the compliance chamber 10 may absorb and store any excess heat generated by this increase in pressure, as the energy used to compress the gas within the compliance chamber 10 is also the energy that increases the temperature of the compliance chamber 10. The gas would then condense on the heat exchanger 80 (e.g., a condenser) and the heat exchanger 80 would store the heat. Further, since the heating unit 75 would maintain the temperature of the chamber internal volume 50 above the evaporation point of the gas, as the gas evaporates, it exerts a biasing action on the flexible membrane 70, such that the flexible membrane is able to follow the changes of displaced volume in the marine vibrator internal volume 40 such that the internal gas volume and gas pressure of the marine vibrator 45 is held nearly constant. In this context, "about" is defined as a deviation of less than or equal to 10% of the measured internal gas pressure of the marine vibrator 45. As a result, stiffness effects (i.e., the air-spring effect) on marine vibrator 45 resonance frequency may be reduced.

The heat exchanger 80 may be any such heat exchange suitable for use. The heat exchanger 80 may function as either a condenser, an evaporator, or both. Heat exchanger 80 may comprise fins or any other such heat exchanging surface. The heat exchangers 80 may be formed from a number of compositions and configurations. For example thin sheets of a metal can be used. Without limitation, the metal may be less than 10 mm thick and may be as long or as wide as needed. The metal sheet can be rolled into a coil with a space between layers. Without limitation by theory, generally, as the surface area of the heat exchanger 80 increases, the rate of heat transfer may increase too as compared to a similar type of heat exchanger with a smaller surface area. This direct relationship may be due in part to the availability of additional surface area for heat exchange allowing a more rapid transfer of heat. Thus, configurations, such as coiling may exchange more heat if the heat exchanger 80 is coiled in a manner to maximize the available surface area of the heat exchanger 80. In various embodiments, the size and shape of the heat exchangers 80 may be scaled up and down to suit operation conditions. In some embodiments, the heat exchangers 80 may be configured with a porous metal structure. Examples of heat exchanger 80 may include various metals. Without limitation, the metals may include silver, aluminum, copper, stainless steel, tantalum, titanium, tungsten, and the like. The metals may be in any form such as metal fiber felt, coiled metal fiber, foamed metal, etc. Felt and foamed metals may be pressed into shapes during manufacture of the heat exchangers 80 to maximize the surface area of the heat exchanger 80. Heat exchanger 80 may be placed at any location within compliance chamber 10.

With continued reference to FIG. 4, in embodiments of compliance chamber 10 that utilize a mixture of a liquid and a gas in a biphasic system, heat exchanger 80 may not be necessary if the liquid has a heat capacity great enough to store the heat generated by the energy used to compress the internal chamber volume 50. In this embodiment, the mixture of the liquid and gas function as spring element 65. Examples of such liquids may include water, ammonia, and the like. In this embodiment, as marine vibrator 45 approaches operational depth, the internal temperature of the compliance chamber 10 may be raised in order to allow the marine vibrator 45 to operate. Any change in the marine vibrator 45 internal gas pressure may then induce flexible membrane 70 to expand into the chamber internal volume 50. The liquid within chamber internal volume 50, may absorb and store any excess heat generated by this increase in pressure and temperature, as the energy used to move the flexible membrane 70 and consequently compress the gas (which may be the vapor form of the liquid) within the compliance chamber 10 is also the energy that increases the temperature of the compliance chamber 10. The heating unit 75 would maintain the temperature of the chamber internal volume 50 above the evaporation point of the liquid, so that as the liquid evaporates, it exerts a biasing action on the flexible membrane 70, such that the flexible membrane is able to follow the changes of displaced volume in the marine vibrator internal volume 40 such that the internal gas volume and gas pressure of the marine vibrator 45 is held nearly constant. In this context, "about" is defined as a deviation of less than or equal to 10% of the measured internal gas pressure of the marine vibrator 45. As a result, stiffness effects (i.e., the air-spring effect) on marine vibrator 45 resonance frequency may be reduced.

In accordance with example embodiments, external energy sources may not be required for operation of the compliance chamber 10. Instead, embodiments of the compliance chamber 10 may operate due to a change in pressure differential (e.g., across a sealed chamber piston 60 or flexible membrane 70) between the marine vibrator internal gas pressure and the chamber internal gas pressure. In some embodiments, the resulting force due to the pressure differential may be counteracted by a force applied to a back side of the chamber piston 60 (e.g., a force applied by a spring, such as a compression spring) or the flexible membrane 70 (e.g., a force applied by a gas). The force balance can occur for both static (e.g., pressure caused due to increasing source depth) and dynamic (acoustic operation of the sound source) applications. Increasing the marine vibrator internal gas pressure typically results in an increased force requirement by compliance chamber 10. The increased force may be achieved through displacement, therefore a volume change may occur within compliance chamber 10 due to changes in the marine vibrator internal gas pressure within marine vibrator 45. As discussed above, changes in the chamber internal volume may compensate for changes in the marine vibrator internal volume when marine vibrator 45 is radiating sound, which may result in a reduction of stiffness effects (i.e., the air-spring effect) of the marine vibrator internal gas on the resonance frequency of marine vibrator 45. Compliance chamber 10 may be appropriately sized to compensate the entire marine vibrator internal volume change of marine vibrator 45, resulting in the same resonance frequency independent of water depth. The stiffness or air-spring effect of the marine vibrator internal gas may be reduced as compliance chamber 10 compensates for any integral gas pressure changes of marine vibrator 45. Combining both these benefits of compliance chamber 10 (e.g., volume compensation and stiffness reduction) may typically result in boosting the low-frequency performance of a marine vibrator 45. Another advantage of compliance chamber 10 may be that it has its own resonance which could increase the acoustic output of marine vibrator 45 and potentially increase the bandwidth.

Figure 5:
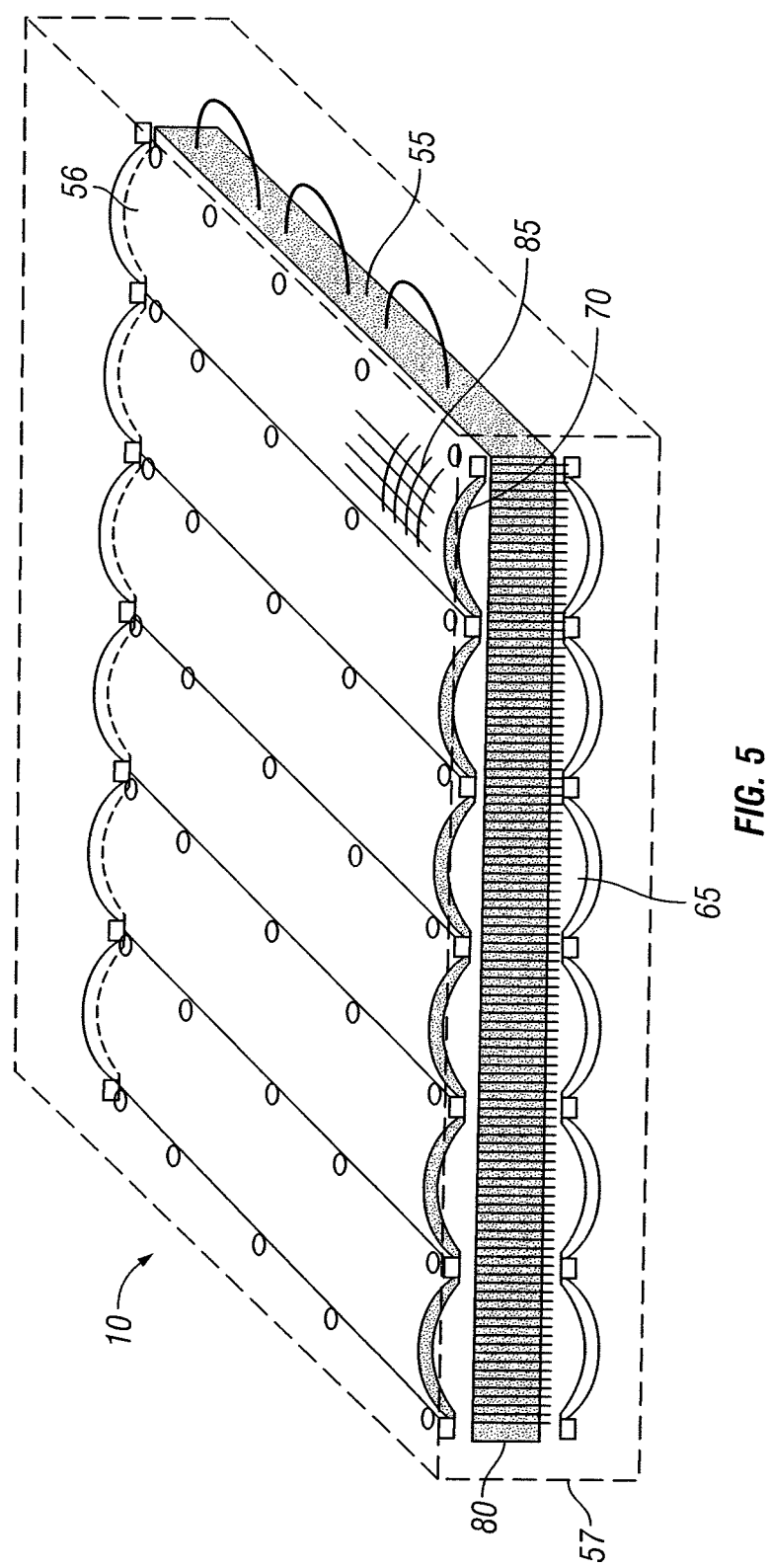
FIG. 5 illustrates another example embodiment of a compliance chamber.

FIG. 5 illustrates another embodiment of compliance chamber 10. For ease of illustration, compliance chamber 10 shown in FIG. 5 is shown unattached to a marine vibrator 45 (e.g., as shown in FIGS. 1-4). However, it should be noted that the embodiment of compliance chamber 10 illustrated in FIG. 4 may be disposed on the interior and/or exterior of any type of marine vibrator 45 (as illustrated in FIGS. 1-4). Moveable structure 56 comprises a flexible membrane 70. Flexible membrane 70 may be individually attached to opposing sides of chamber housing 55. A housing 57 may be used to enclose the device to seal the edges of the compliance chamber 10 while still allowing the internal volume of the marine vibrator 45 to contact the flexible membrane 70. If this embodiment of compliance chamber 10 is coupled externally to marine vibrator 45, housing 57 may comprise a pressure housing fluidically coupled to the internal volume of the marine vibrator 45. A mesh 85 may surround flexible membrane 70 so as to prevent rupture. A heat exchanger 80 may be disposed between the sides of flexible membrane 70 so as to create two opposing sides of the chamber internal volume 50. Heat exchanger 80 may possess fins to aid in heat exchange. The compliance chamber 10 may comprise a heating unit (not shown) and a gas or a mixture of a liquid and a gas that function as spring element 65 disposed with flexible membrane 70. The flexible membrane 70 may swell or contract as the chamber internal pressure adjusts to the changes of displaced volume in the marine vibrator internal volume 40 such that the internal gas volume and gas pressure of the marine vibrator 45 is held nearly constant. In this context, "about" is defined as a deviation of less than or equal to 10% of the measured internal gas pressure of the marine vibrator 45. As a result, stiffness effects (i.e., the air-spring effect) on marine vibrator 45 resonance frequency may be reduced.

Figure 6:
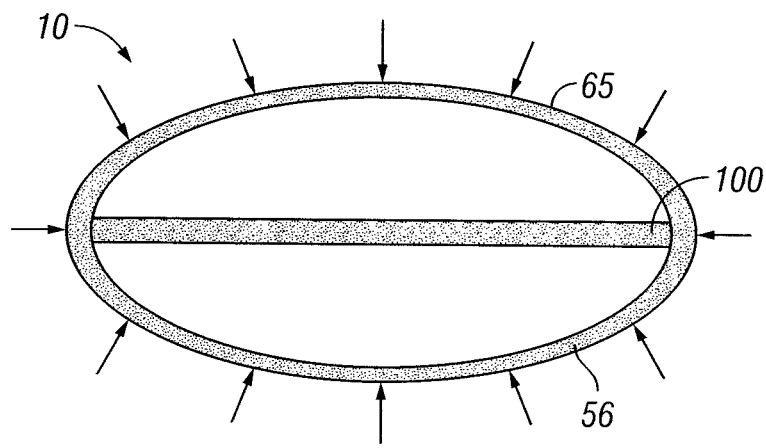
FIG. 6 illustrates another example embodiment of a compliance chamber.

FIG. 6 illustrates another compliance chamber 10 embodiment. FIG. 6 illustrates a compliance chamber 10 with a moveable structure 56 comprising a flextensional shell which functions as spring element 65. A flextensional shell compliance chamber may achieve nonlinearity of displacement with increasing depth by using a hollow flextensional shell 65 that includes a central stiff structure 100. In some embodiments, the central stiff structure 100 may comprise a heat exchanger 80 (as shown on FIGS. 4 and 5). Further, in some embodiments the compliance chamber 10 may comprise a heating unit 75 (as shown on FIG. 4). When the external pressure increases, the flextensional shell may start to buckle, for example, in a center region between attachment to the central stiff structure 100, when a pressure difference between the internal and the external pressure increases sufficiently. In the pressure range where the buckling occurs, the compliance of the structure may increase considerably. As used herein, "buckle" describes the state in which the surface of the flextensional shell begins to bend, flex, or otherwise deform from the pressure exerted against the flextensional shell. Further, the flextensional shell 65 embodiment of a compliance chamber 10 may include any of the gases or mixtures of liquids and gases discussed above. In various embodiments, the marine vibrator internal volume 40 (as shown on FIGS. 1-4) and/or connected volumes may include such embodiments of compliance chambers 10 of appropriate number and/or size either affixed or not affixed thereto.

Figure 7:
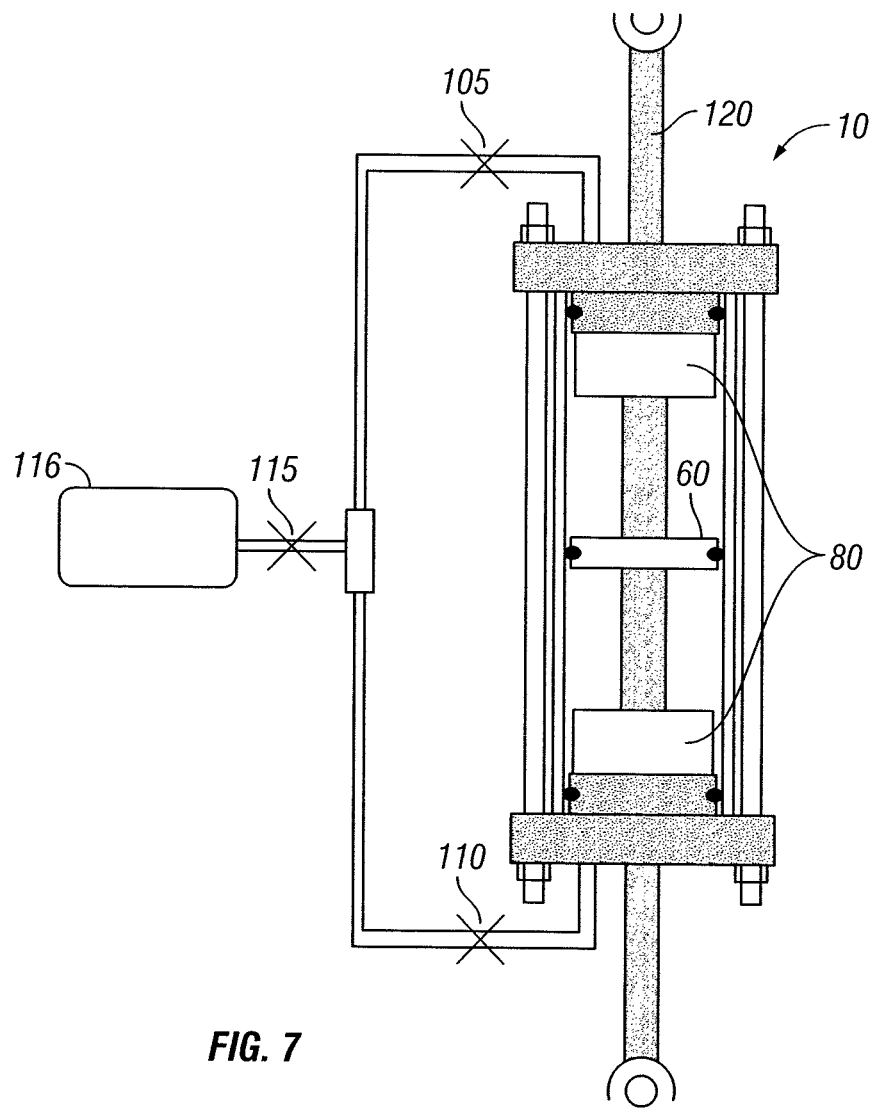
FIG. 7 illustrates another example embodiment of a compliance chamber.

In order to test the functionality of some of the components of a compliance chamber 10, a compliance chamber testing apparatus was built. FIG. 7 illustrates an example testing apparatus to test a compliance chamber 10. The compliance chamber 10 may be filled with a gas/liquid mixture with valves 105, 110, and 115 opened. A gas, for example, propane, tetrafluoroethane, water vapor, air, etc. may be stored in chamber 116 and heated if desired. Propane at room temperature may be tested at 8-9 bar pressure. Tetrafluoroethane may be tested at 6 bar pressure (absolute pressure, if corresponding to a depth of 50 meters) at room temperature. For example, the tetrafluoroethane may be heated to 50 degrees within the chamber 116, which can result in 13 bar absolute pressure corresponding to 120 meters. The friction of the system may be checked. The rod 120 with its attached chamber piston 60 may move with valves 105 and 110 open and valve 115 closed. This results in the same pressure on both sides. After valves 105 and 110 are closed, the rod 120 can be moved through 60 mm displacement and a force needed for such a displacement can be measured as a function of speed. There may be little or no additional force needed at slow speed. As the chamber piston 60 moves via rod 120, the gas will be compressed and consequently condensed by the heat exchanger 80 on the side in which the chamber piston 60 moves into (i.e. the side in which chamber piston 60 displaces at least a portion of the volume). On the opposing side, any condensed gas may be vaporized to maintain a constant pressure in the volume that was expanded. As a result of the heat exchangers 80 in the top and bottom chambers, both the top and bottom chambers will maintain essentially the same pressure at higher displacement speeds, regardless of their resulting volume, and there will be little or no net additional force required on chamber piston 60.

With reference to FIGS. 1-7, compliance chamber 10 may be disposed on a flextensional shell-type marine vibrator 5 as shown in FIG. 1, a piston-type marine vibrator 30 as shown in FIG. 2, or on any other type of marine vibrator 45 as shown in FIGS. 3 and 4 by being coupled to containment housing 90 of marine vibrator 45. Compliance chamber 10 may be in contact with marine vibrator internal volume 25 through an opening, port, window, or the like in containment housing 90. However, contact between marine vibrator 45 and compliance chamber 10 does not imply that any liquid or gas residing in either marine vibrator 45 or compliance chamber 10 is able to pass into the other. The marine vibrator internal gas and the chamber internal gas may not be in contact, and as such are not exposed to one another and do not contact one another. Similarly, the marine vibrator internal volume and compliance chamber internal volume are not in contact, and as such are not exposed to one another. However, although the marine vibrator internal volume 40 and consequently any marine vibrator internal gas are not in contact with the chamber internal volume 50 and any chamber internal gas, embodiments of the compliance chamber 10 may allow for changes in pressure of the marine vibrator internal gas to effect a change in pressure in the chamber internal gas and vice versa. Compliance chamber 10 may be disposed on the exterior of any part of containment housing 90. In alternative embodiments, compliance chamber 10 may be disposed on the interior of any marine vibrator 45. Compliance chamber 10 may be coupled to containment housing 90 using any sufficient means, for example, a threaded connection. Compliance chamber 10 may be in contact with marine vibrator internal volume 40 through a hole, opening, port, or the like in containment housing 90.

In some embodiments, marine vibrator 45 may produce at least one resonance frequency between about 1 Hz to about 200 Hz when submerged in water at a depth of from about 0 meters to about 300 meters. In alternative embodiments, marine vibrator 45 may display at least one resonance frequency between about 0.1 Hz and about 100 Hz, alternatively, between about 0.1 Hz and about 10 Hz, and alternatively, between about 0.1 Hz and about 5 Hz when submerged in water at a depth of from about 0 meters to about 300 meters. Marine vibrator 45 may be referred to as a very low frequency source where it has at least one resonance frequency of about 10 Hz or lower.

Figure 8:
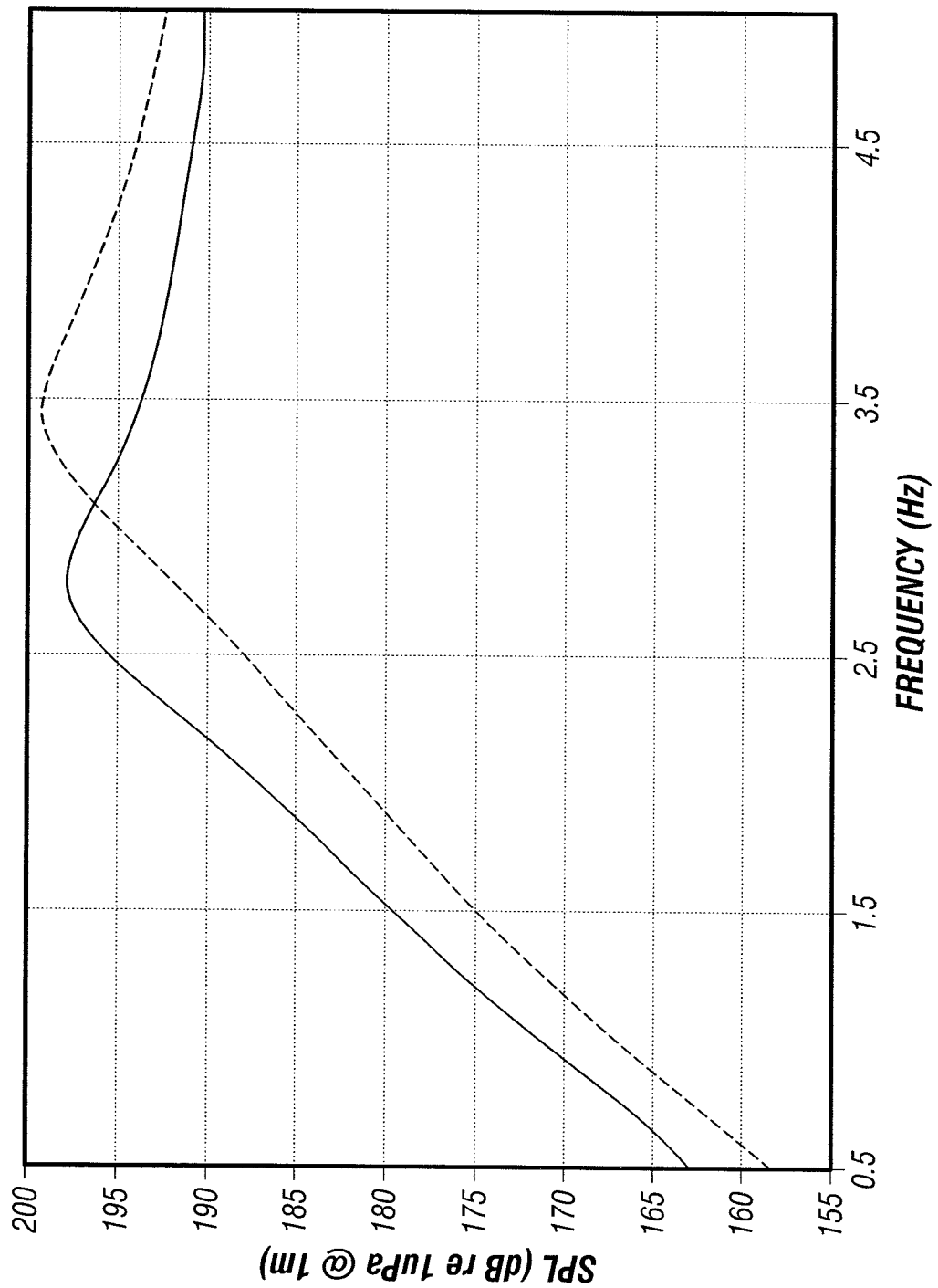
FIG. 8 illustrates the change in the air spring effect as the pressure and volume of an internal gas is altered in accordance with example embodiments.

FIG. 8 illustrates the effect of an air spring on marine vibrator 45 at various depths in accordance with example embodiments. More particularly, FIG. 8 shows the results from a finite element simulation to evaluate the use of compliance chamber 10 in a marine vibrator 45 in accordance with example embodiments. The output of marine vibrator 45 with four compliance chambers 10 is shown as the solid line on FIG. 8. The output of the same marine vibrator 45 without any compliance chambers 10 is shown as the dotted line on FIG. 8. The curves represent the marine vibrator output when towed in seawater at a depth of about 50 meters. Each compliance chamber 10 had a chamber spring constant (dynamic portion only) of 1.0E+5 Newtons per meter. The air spring in the marine vibrator internal volume had a spring constant of 2.86E+6, calculated from the bulk modulus. As illustrated by FIG. 8, employment of compliance chambers 10 decreased the resonance frequency from 3.4 Hz to 2.7 Hz. In addition, the output at all frequencies below the resonance frequency was increased by about 4 decibels to about 5 decibels.

Figure 9:
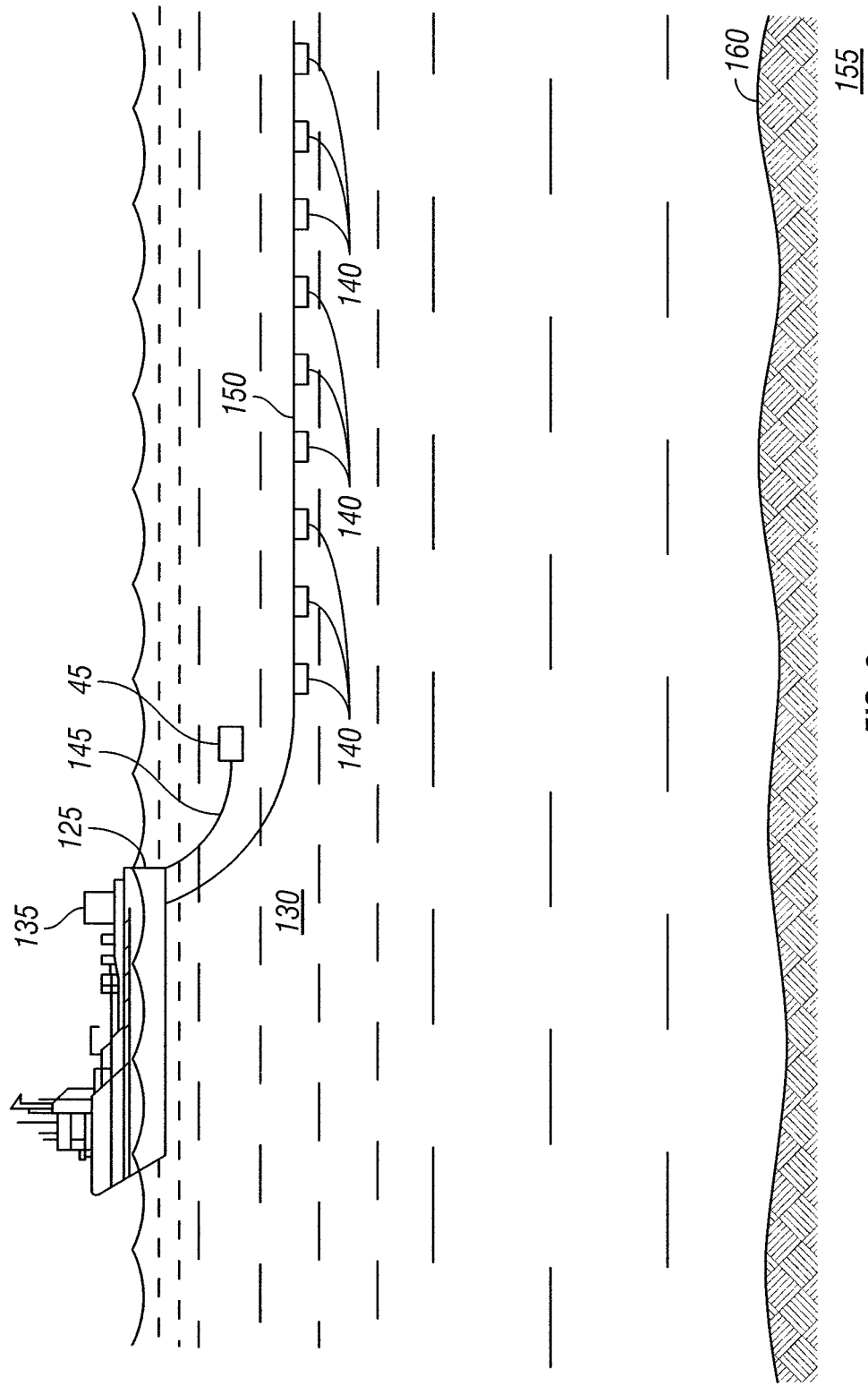
FIG. 9 is an example embodiment of a marine seismic survey system using a marine vibrator.

FIG. 9 illustrates an example technique for acquiring geophysical data that may be used with embodiments of the present techniques. In the illustrated embodiment, a survey vessel 125 moves along the surface of a body of water 130, such as a lake or ocean. The survey vessel 125 may include thereon equipment, shown generally at 135 and collectively referred to herein as a "recording system." The recording system 135 may include devices (none shown separately) for detecting and making a time indexed record of signals generated by each of seismic sensors 140 (explained further below) and for actuating a marine vibrator 45 at selected times. The recording system 135 may also include devices (none shown separately) for determining the geodetic position of the survey vessel 125 and the various seismic sensors 140.

As illustrated, survey vessel 125 (or a different vessel) may tow marine vibrator 45 in body of water 130. Source cable 145 may couple marine vibrator 45 to survey vessel 125. Marine vibrator 45 may be towed in body of water 130 at a depth ranging from 0 meters to about 300 meters, for example. While only a single marine vibrator 45 is shown in FIG. 9, it is contemplated that embodiments may include more than one marine vibrator 45 (or other type of sound source) towed by survey vessel 125 or a different vessel. In some embodiments, one or more arrays of marine vibrators 45 may be used. At selected times, marine vibrator 45 may be triggered, for example, by recording system 135, to generate acoustic energy. Survey vessel 125 (or a different vessel) may further tow at least one sensor streamer 150 to detect the acoustic energy that originated from marine vibrator 45 after it has interacted, for example, with rock formations 155 below water bottom 160. As illustrated, both marine vibrator 45 and sensor streamer 150 may be towed above water bottom 160. Sensor streamer 150 may contain seismic sensors 140 thereon at spaced apart locations. In some embodiments, more than one sensor streamer 150 may be towed by survey vessel 125, which may be spaced apart laterally, vertically, or both laterally and vertically. While not shown, some marine seismic surveys locate the seismic sensors 140 on ocean bottom cables or nodes in addition to, or instead of, a sensor streamer 150. Seismic sensors 140 may be any type of seismic sensors known in the art, including hydrophones, geophones, particle velocity sensors, particle displacement sensors, particle acceleration sensors, or pressure gradient sensors, for example. By way of example, seismic sensors 140 may generate response signals, such as electrical or optical signals, in response to detected acoustic energy. Signals generated by seismic sensors 140 may be communicated to recording system 135.

The detected energy may be used to infer certain properties of the subsurface rock, such as structure, mineral composition and fluid content, thereby providing information useful in the recovery of hydrocarbons.

In accordance with an embodiment of the invention, a geophysical data product may be produced. The geophysical data product may include geophysical data that is obtained by a process that includes detecting the acoustic energy originating from marine vibrator 45. The geophysical data product may be stored on a non-transitory, tangible computer-readable medium. The geophysical data product may be produced offshore (i.e. by equipment on a vessel) or onshore (i.e. at a facility on land) either within the United States or in another country. If the geophysical data product is produced offshore or in another country, it may be imported onshore to a facility in the United States. Once onshore in the United States, geophysical analysis, including further data processing, may be performed on the data product.

The foregoing figures and discussion are not intended to include all features of the present techniques to accommodate a buyer or seller, or to describe the system, nor is such figures and discussion limiting but exemplary and in the spirit of the present techniques.

What is claimed is:

1. A marine vibrator comprising:
a containment housing, where the containment housing comprises a marine vibrator internal volume, wherein the marine vibrator internal volume comprises a first gas at a first gas pressure;
a sound radiating surface; and
a compliance chamber in contact with the first gas, wherein the compliance chamber comprises a chamber housing and a moveable structure, wherein at least the chamber housing and the moveable structure form a compliance chamber internal volume which holds a second gas at a second gas pressure, wherein the moveable structure is configured to move in response to a change in the first gas pressure, wherein a biasing action is exerted against the moveable structure by a two-phase gas spring in combination with a non-linear mechanical spring, and wherein the compliance chamber is configured to condense the second gas in response to compression of the marine vibrator internal volume by the moveable structure.

2. The marine vibrator of claim 1, wherein the moveable structure comprises a chamber piston slidable in the chamber housing.

3. The marine vibrator of claim 1, wherein the moveable structure comprises a flexible membrane.

4. The marine vibrator of claim 1, wherein the non-linear mechanical spring comprises at least one spring element selected from the group consisting of a coil spring, a leaf springs, and a Belleville spring washer.

5. The marine vibrator of claim 1, wherein a shift in the first gas pressure causes a shift in the second gas pressure.

6. The marine vibrator of claim 1, wherein the second gas comprises propane or tetrafluroethane.

7. The marine vibrator of claim 1, wherein the two-phase gas spring comprises a mixture of the second gas and a liquid.

8. The marine vibrator of claim 7, wherein the second gas comprises water vapor and the liquid comprises liquid water.

9. The marine vibrator of claim 1, wherein the moveable structure comprises a hollow flextensional shell that buckles at a particular pressure.

10. The marine vibrator of claim 1, wherein the compliance chamber further comprises a heating unit and a heat exchanger.

11. The marine vibrator of claim 1, wherein the first gas pressure is kept about constant while the sound radiating surface is radiating sound.

12. The marine vibrator of claim 1, wherein the compliance chamber is disposed on the exterior of the marine vibrator.

13. A marine vibrator comprising:
- a containment housing, where the containment housing comprises a marine vibrator internal volume, wherein the marine vibrator internal volume comprises a first gas at a first gas pressure;
- a compliance chamber in contact with the first gas, wherein the compliance chamber comprises a chamber housing and a moveable structure, wherein at least the chamber housing and the moveable structure form a compliance chamber internal volume which is sealed from the marine vibrator internal volume and holds a second gas at a second gas pressure, wherein the moveable structure is configured to move in response to a change in the first gas pressure, wherein a biasing action is exerted against the moveable structure by a two-phase gas spring, wherein the compliance chamber is configured to condense the second gas in response to compression of the marine vibrator internal volume by the moveable structure, and wherein the moveable structure comprises a flexible membrane;
- a heating unit configured to evaporate the second gas in the compliance chamber internal volume; and
- a condenser in the form of a heat exchanger configured to condense a film of the second gas onto a surface of the condenser.

14. The marine vibrator of claim 13, wherein wherein the second gas comprises at least one gas selected from the group consisting of propane, tetrafluroethane, and combinations thereof.

15. The marine vibrator of claim 13, wherein the two-phase gas spring comprises a mixture of the second gas and water.

16. The marine vibrator of claim 15, wherein the heat exchanger is configured to absorb and store heat generated by a pressure increase of the first gas.

17. The marine vibrator of claim 13, wherein the flexible membrane is configured to expand into the compliance chamber internal volume.

18. The marine vibrator of claim 13, wherein the flexible membrane comprises mesh, wherein the mesh is configured to prevent rupturing of the flexible membrane.

19. The marine vibrator of claim 13, wherein the flexible membrane is configured to contract or swell as a compliance chamber internal pressure adjusts to changes of a displaced volume in the marine vibrator internal volume.

20. The marine vibrator of claim 13, wherein the flexible membrane is attached to opposing sides of the chamber housing.

* * * * *